(12) United States Patent
Ishikawa

(10) Patent No.: US 8,817,286 B2
(45) Date of Patent: Aug. 26, 2014

(54) COMMUNICATION SYSTEM, METHOD AND STORAGE MEDIUM

(71) Applicant: Satoshi Ishikawa, Kanagawa (JP)

(72) Inventor: Satoshi Ishikawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 2 days.

(21) Appl. No.: 13/778,665

(22) Filed: Feb. 27, 2013

(65) Prior Publication Data

US 2013/0242325 A1 Sep. 19, 2013

(30) Foreign Application Priority Data

Mar. 19, 2012 (JP) ................................. 2012-061723

(51) Int. Cl.
*G06F 3/12* (2006.01)
*G03G 15/00* (2006.01)
*G06Q 30/00* (2012.01)

(52) U.S. Cl.
USPC .......... 358/1.13; 358/1.15; 399/24; 705/27.1; 705/29

(58) Field of Classification Search
None
See application file for complete search history.

(56) References Cited

U.S. PATENT DOCUMENTS 8,352,334 B2 * 1/2013 Ulinski ..................... 705/27.1
2005/0137945 A1 * 6/2005 Sato ............................. 705/28

FOREIGN PATENT DOCUMENTS

JP 2004-086414 3/2004

* cited by examiner

*Primary Examiner* — Thomas Lett
(74) *Attorney, Agent, or Firm* — Oblon, Spivak, McClelland, Maier & Neustadt, L.L.P.

(57) ABSTRACT

A communication system includes an apparatus transmitting management information about management of consumable supplies and a mobile communication device that receives the management information. The communication device includes a detection part configured to detect a position of the communication device; a memory part configured to store a supplier's name of the consumable supplies and a position of the supplier; a setting part configured to set an area specified by a circle with a radius of predetermined length, which is centered on the position of the supplier stored in the memory part, as a control area; a display part; and a display control part configured to allow the display part to display the management information, the name of the supplier, and/or the position of the supplier when the display control part receives the management information from the apparatus and the position detected by the detection part falls within the control area.

17 Claims, 13 Drawing Sheets

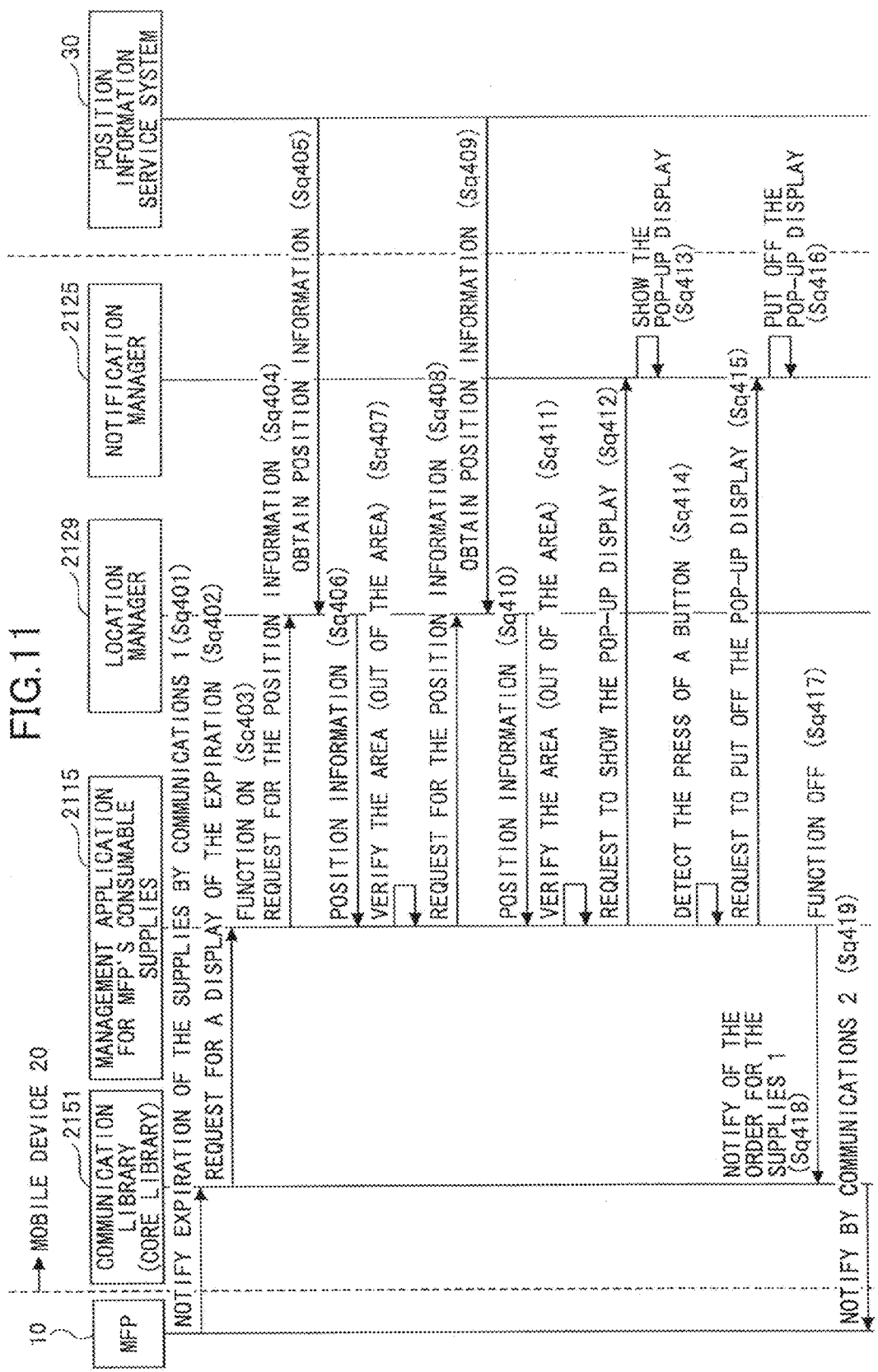

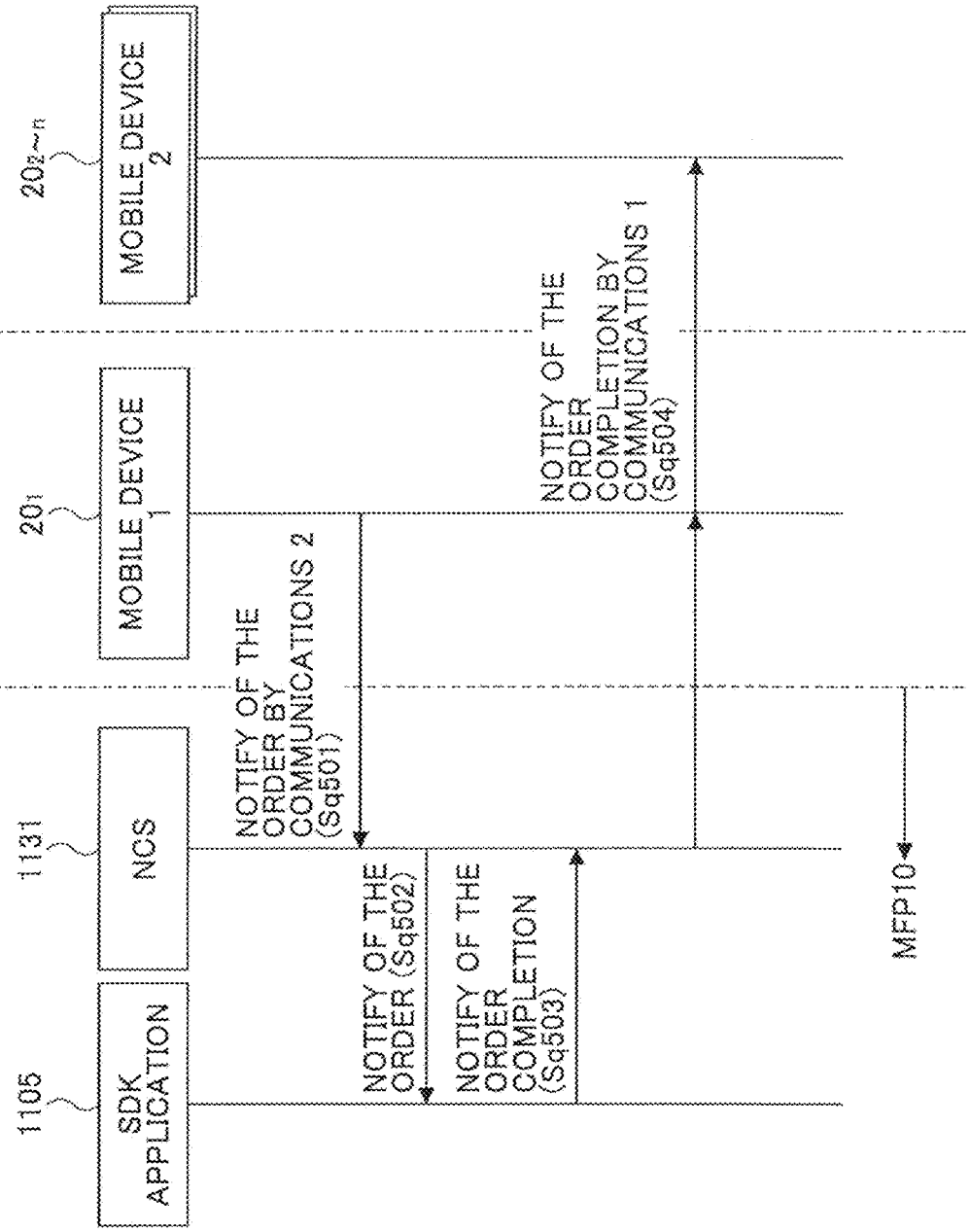

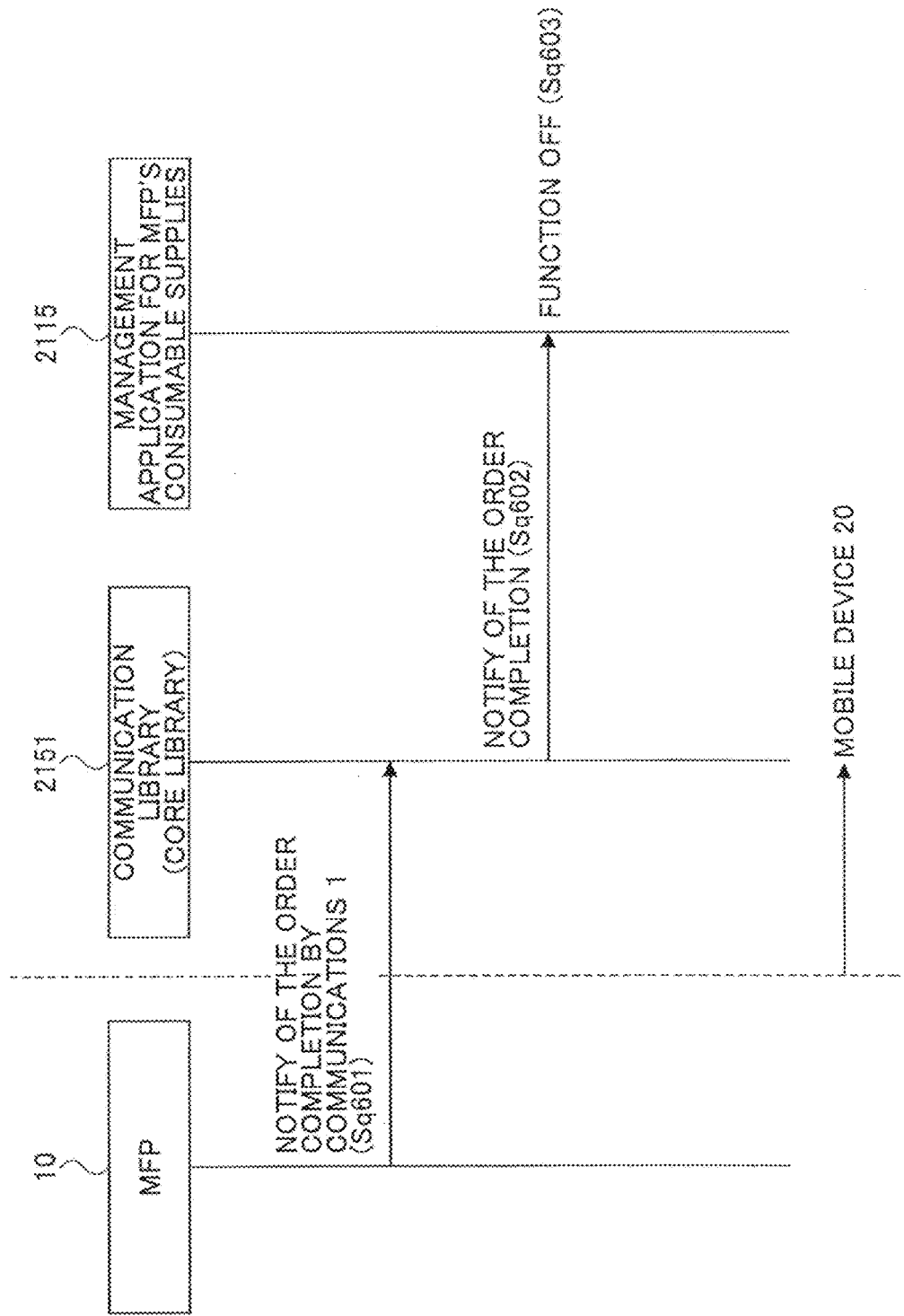

COMMUNICATION SYSTEM, METHOD AND STORAGE MEDIUM

BACKGROUND OF THE INVENTION

1. Field of the Invention

The present invention relates to a communication system, a method for the communication system and a storage medium, and more particularly relates to a communication system in which a device managing supplies notifies a mobile communication device of management information (e.g. their validity date has expired), a notification method for the management information and a storage medium.

2. Description of the Related Art

A system is known in which an image forming apparatus such as a Multi-Functional Peripheral (MFP) manages supplies to be replaced (e.g. toner or ink, etc.). The system notifies an administrator's PC or a supplier's service center of expiration of the validity date in advance or immediately by e-mail or Web service via a communication channel such as Local Area Network (LAN), the Internet or public line.

A system disclosed in Japanese Laid-Open Patent Application No. 2004-86414 is an instance of such a system. Patent Document discloses a system for improving the efficiency of a task of ordering consumable supplies. In this system, an information management apparatus receives a replenishment or replacement alert regarding consumable supplies from an image information apparatus under its control. Upon receiving the alert, the information management apparatus acquires, from a pertinent shop, information regarding the consumable supplies to be replenished and information indicative of where to send an order, and displays such information on the terminal that is used to send an order.

A function to provide information to be used for the order at the time when the validity date comes allows the MFP to reduce downtime due to the shortage of the consumable supplies, which results in relatively good convenience. However, in a case where either the user cannot order the supplies with the terminal or the user wants to confirm the real thing, the user has to visit the Source of the supplies. If the user cannot spare time to visit the Source, he may eventually forget to visit and encounter trouble. On the other hand, a service provided by a MFP vendor exists, which delivers the consumable supplies for such a busy user. However, the user is required to pay an additional fee for the service. In addition, the vendor has to prepare a large system to provide the service. This invention aims to allow a device managing the supplies to transmit a notification to a receiver at such location and time that the receiver is able to respond to the notification immediately.

SUMMARY OF THE INVENTION

In one embodiment, there is a communication system in which an apparatus transmits management information about management of consumable supplies and a mobile communication device receives the management information via a network,
wherein the communication device includes:
a detection part configured to detect a position of the communication device;
a memory part configured to store a name of a supplier of the consumable supplies and a position of the supplier;
a setting part configured to set an area specified by a circle with a radius of predetermined length, which centers on the position of the supplier stored in the memory part, as a control area;
a display part; and
a display control part configured to allow the display part to display the management information, the name of the supplier, and/or the position of the supplier when the display control part receives the management information from the apparatus and the position detected by the detection part falls within the control area.

In another embodiment, there is a method of a communication system in which an apparatus transmits management information about management of consumable supplies and a communication device receives the management information via a network, wherein the method includes:
detecting a position of the communication device;
setting an area specified by a circle with a radius of predetermined length, which centers on a position of a supplier of the consumable supplies as a control area, wherein the position of the supplier is stored in a memory part of the communication device; and
displaying the management information, a name of the supplier stored in the memory part, and/or the position of the supplier on the communication device when the communication device receives the management information from the apparatus and the position of the communication device detected falls within the control area.

In another embodiment, there is a computer-readable storage medium for storing a program therein, the program causing a communication system in which an apparatus transmits management information about management of consumable supplies and a mobile communication device receives the management information via a network to execute a method, wherein the method includes:
detecting a position of the communication device;
setting an area specified by a circle with a radius of predetermined length, which centers on a position of a supplier of the consumable supplies as a control area, wherein the position of the supplier is stored in a memory part of the communication device; and
displaying the management information, a name of the supplier stored in the memory part, and/or the position of the supplier on the communication device when the communication device receives the management information from the apparatus and the position of the communication device detected falls within the control area.

According to this invention, a user of a receiver is able to finish a task for the supplies by transmitting management information for a mobile device of the user (e.g. a validity date expires) when the mobile device is located near the Source of the supplies.

BRIEF DESCRIPTION OF THE DRAWINGS

Other objects and further features of embodiments may become apparent from the following detailed description when read in conjunction with the accompanying drawings, in which:

FIG. 11 is a drawing illustrating a sequence of actions of the mobile device responding to the expiration notification of the consumable supplies;

FIG. 12 is a drawing illustrating a sequence of actions of the MFP after receipt of the notification for the order of the consumable supplies; and FIG. 13 is a drawing illustrating a sequence of actions of the mobile device after receipt of the notification indicating completion of an order of the consumable supplies.

DESCRIPTION OF THE PREFERRED EMBODIMENTS

In the following, embodiments of the present invention will be described with reference to the accompanying drawings. An embodiment of a communication system of this invention is explained using an MFP as a device which is able to manage consumable supplies and notify an administrator or a user of management information related to the supplies. In the following example, the MFP notifies the user of an expiration date of the consumable supplies (e.g. toner or ink used by the MFP) and the user visits a distributor to purchase the consumable supplies. However, this invention is not limited to the consumable supplies such as toner or ink. The invention can be applied to a similar case where a user visits a Source (i.e. a provider) of supplies—which are consumable and require some sort of management—responding to a notification of management information and received services.

[Configuration of Communication System]

A communication system in this embodiment comprises a MFP having a function to manage the consumable supplies and a mobile communication device (mobile device) communicating with the MFP. The mobile device may be any kind of mobile devices which are able to communicate with the MFP (e.g. a mobile phone such as a smart phone or a mobile information terminal such as Personal Digital Assistant (PDA) connecting to an IP network via an access point). The mobile device has a device measuring position of the device itself. For example, the device may use Global Positioning System (GPS).

Figure 1:
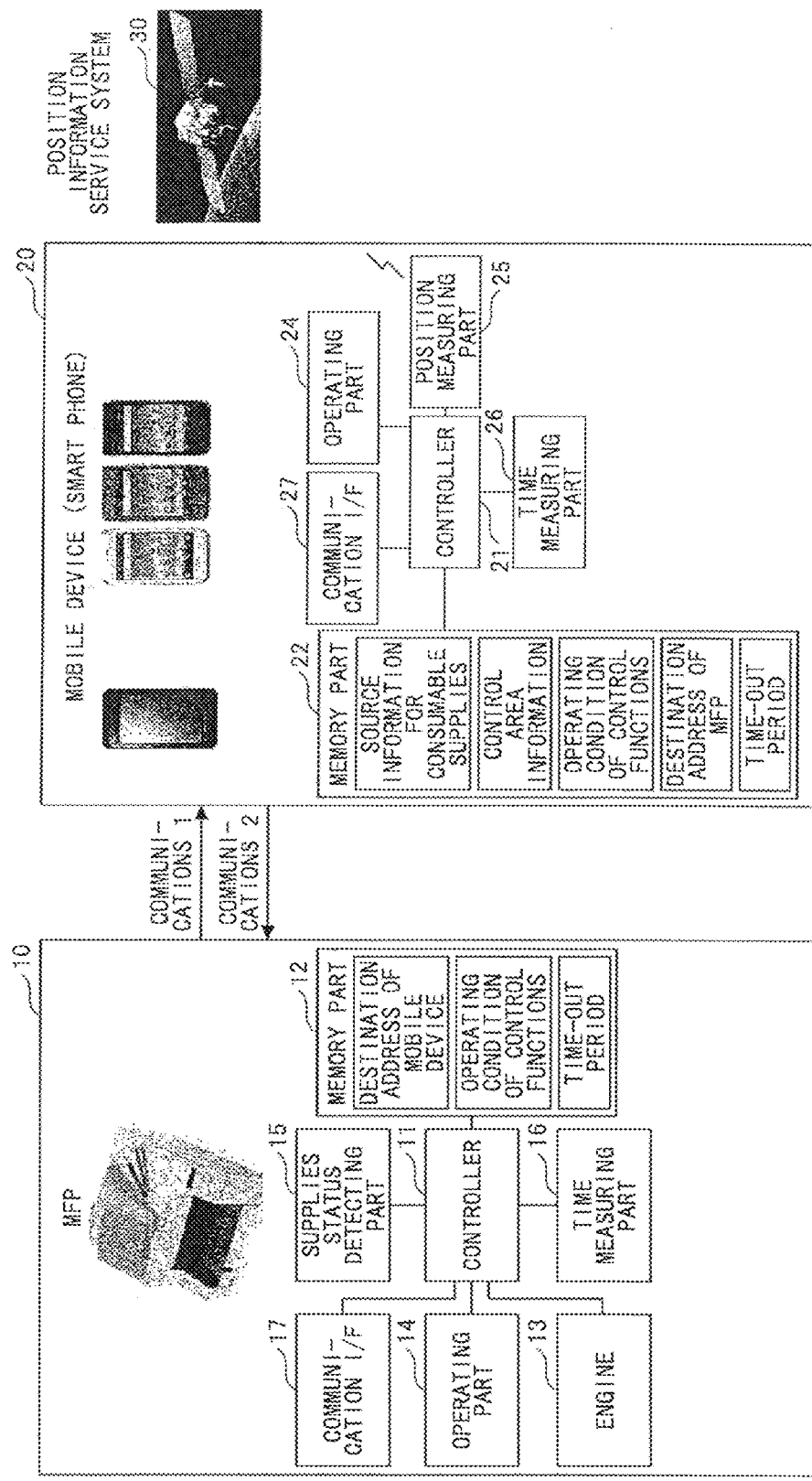
FIG. 1 is a drawing illustrating a communication system according to an embodiment of the invention.

FIG. 1 shows an overview of a configuration for the communication system of this embodiment. The communication system in FIG. 1 connects a MFP 10 with a mobile device 20 by communications 1 and communications 2. A notification function of an expiration of the consumable supplies (a consumable supplies management information notification function) is performed via the communications 1 of the MFP 10. On the other hand, a system of another embodiment of this invention may bi-directionally communicate via the communications 1 and the communications 2 and manage plural of the mobile devices. Furthermore, in order to measure the position of the mobile device 20 itself, the mobile device 20 may use a position information service system 30 such as externally deployed GPS.

<Configuration of MFP 10>

The MFP 10 has a controller 11, and, as a part under control of the controller 11, a memory part 12, an engine 13, an operating part 14, a detecting part for condition of the consumable supplies 15, a time measuring part 16 and a communication interface (I/F) 17. The engine 13 has a scanner obtaining image data from paper media and a plotter printing the image data on the paper media. In the communication system, detection for the usage of the consumable supplies such as toner or ink, which is original management information reported to the mobile device 20, is performed using sensors attached to the scanner or the plotter. The detecting part may detect a usage condition (e.g. toner end) with the detection result and notify the controller 11 of the condition.

The memory part 12 stores information (data) used by the MFP 10 for communication with the mobile device 20, which contains a "destination address of the mobile device", "operating condition of control functions (on/off)" and "time-out period". The memory part 12 is a storage device under control of the controller 11 (described in detail below), and it may be a storage device of the controller 11. The time measuring part 16 is used to control a time-out period under control of the controller 11.

The operating part 14 has an operating device such as keys and a display device. A user operates the operating part 14 to instruct the MFP 10 to process something by input operation via the keys. The MFP 10 notifies the user via the display device of a condition of the MFP 10. Thus, the operating part 14 is an interface between the user and the MFP 10 (i.e. a user interface). The communication interface 17 controls communications 1 and communications 2 and performs data processing according to a certain communication protocol (e.g. IP).

The controller 11 has a Central Processing Unit(s) (CPU) for executing instructions of software programs; a Read Only Memory (ROM) for storing programs and control data used by the CPU for controls or processes (including measurement positions) of the controller; a Random Access Memory (RAM) for temporarily storing image data and transmission data generated by the program and for storing data required for operation of the software program (i.e. working memory); a Non Volatile (NV) RAM for storing configuration data for device-unique conditions and information required to create control instructions and communicate with the mobile device 20; and a mass storage device for storing data and programs. Therefore, a controller consists of a computer in which the CPU, the ROM, the RAM, the NVRAM and the mass storage device are connected by a bus.

Figure 2:
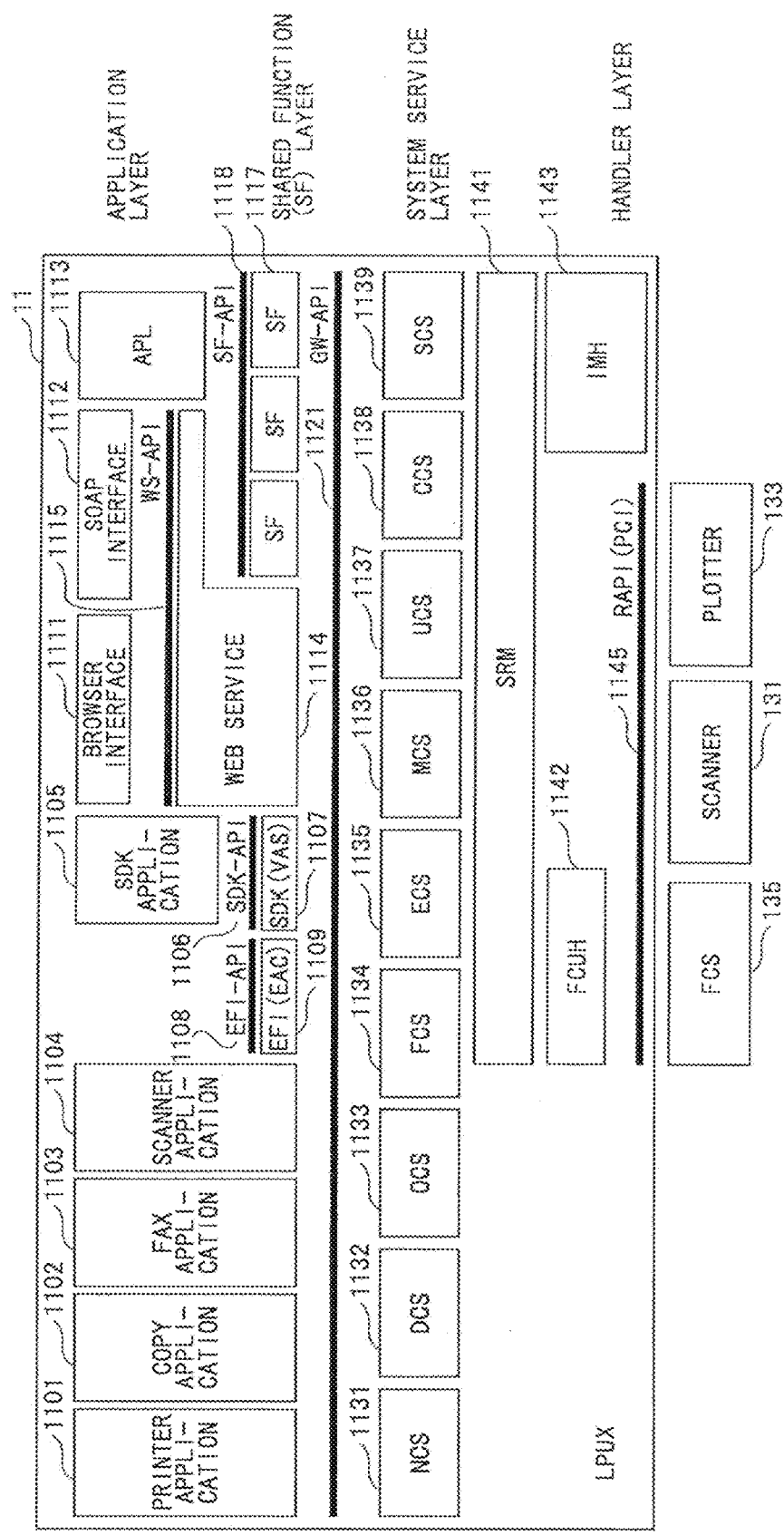
FIG. 2 is a drawing illustrating a functional block diagram for software configuration of a MFP's controller in FIG. 1.

Here, a software configuration of the controller 11 is explained. FIG. 2 shows a functional block diagram of software configuration for the controller 11 of the MFP 10. As shown in FIG. 2, the software configuration of the controller 11 contains LPUX which is an Operating System (OS) working on the computer; and software implementing functions of Application layer, Shared Function (SF) layer, System service layer and Handler layer on the OS.

The application layer consists of applications including printer application 1101, copy application 1102, fax application 1103, scanner application 1104, and Software Development Kit (SDK) application 1105; and function modules including SDK (VAS) application 1107 and its API (application program interface) 1106, EFI (EAC) application 1109 and its API 1108, Web service 1114 and associated application 1113, WS-API 1115, Browser interface 1111 and SOAP (SOAP Net File) interface 1112. The notification function of consumable supplies management information described later is implemented by the SDK application 1105.

The SF layer has function modules including a SF family 1117 and associated API 1118. The system service layer has function modules including Network Control Service (NCS) 1131, Delivery Control Service (DCS) 1132, Operation panel Control Service (OCS) 1133, Fax Control Service (FCS) 1134, Engine Control Service (ECS) 1135, Memory Control Service (MCS) 1136, User information Control Service (UCS) 1137, Certificate Control Service (CCS) 1138 and System Control Service (SCS) 1139 as Control Service (CS). GW-API 1121 exists between the system service layer and upper application layer.

The handler layer has function modules including a System Resource Manager (SRM) 1141, a Fax Control Unit Handler (FCUH) 1142 and an Image Memory Handler (IMH) 1143. The function modules of the handler layer perform data processing related to operations for hardware (device) of FCS 135, Scanner 131 and Plotter 133. RAPI (PCI) 1145 is a function module to connect the system service layer with the scanner 131, the FCS 135 and the plotter 113.

<Configuration of Mobile Device 20>

The mobile device 20 has, as a part under control of a controller 21, a memory part 22, an operating part 24, a position measuring part 25, a time measuring part 26 and a communication interface 27. The memory part 22 stores information (data) used by the mobile device 20 for communication with the MFP 10, which contains "information about a source of the consumable supplies", "control area information", "Destination address of MFP", "operating condition of control functions (on/off)" and "time-out period". The memory part 22 is a storage device under control of the controller 21, and it may be a storage device of the controller 21.

The operating part 24 has an operating device such as keys and a display device. A user operates the operating part 24 to instruct the mobile device 20 to process something by input operations via the keys. The mobile device 20 notifies the user via the display device of a condition of the device 20. Thus, the operating part 24 is a user interface. The position measuring part 25 measures positions of the mobile device 20 by latitude and longitude with a position information service system 30 such as GPS. The time measuring part 26 is used to control the time-out period under control of the controller 21. The communication interface 27 controls communications 1 and communications 2 and performs data processing according to a certain communication protocol (e.g. IP).

The controller 21 has a Central Processing Unit(s) (CPU) for executing instructions of software programs; a Read Only Memory (ROM) for storing programs and control data used by the CPU for controls or processes (including measurement positions) of the controller; a Random Access Memory (RAM) for temporarily storing image data and transmission data generated by the program and for storing data required for operation of the software program (i.e. working memory); a Non Volatile (NV) RAM for storing configuration data for device unique conditions and information required to create control instructions and communicate with the MFP 10; and a mass storage device for storing data and programs. Therefore, a controller consists of a computer in which the CPU, the ROM, the RAM, the NVRAM and the mass storage device are connected by a bus.

Figure 3:
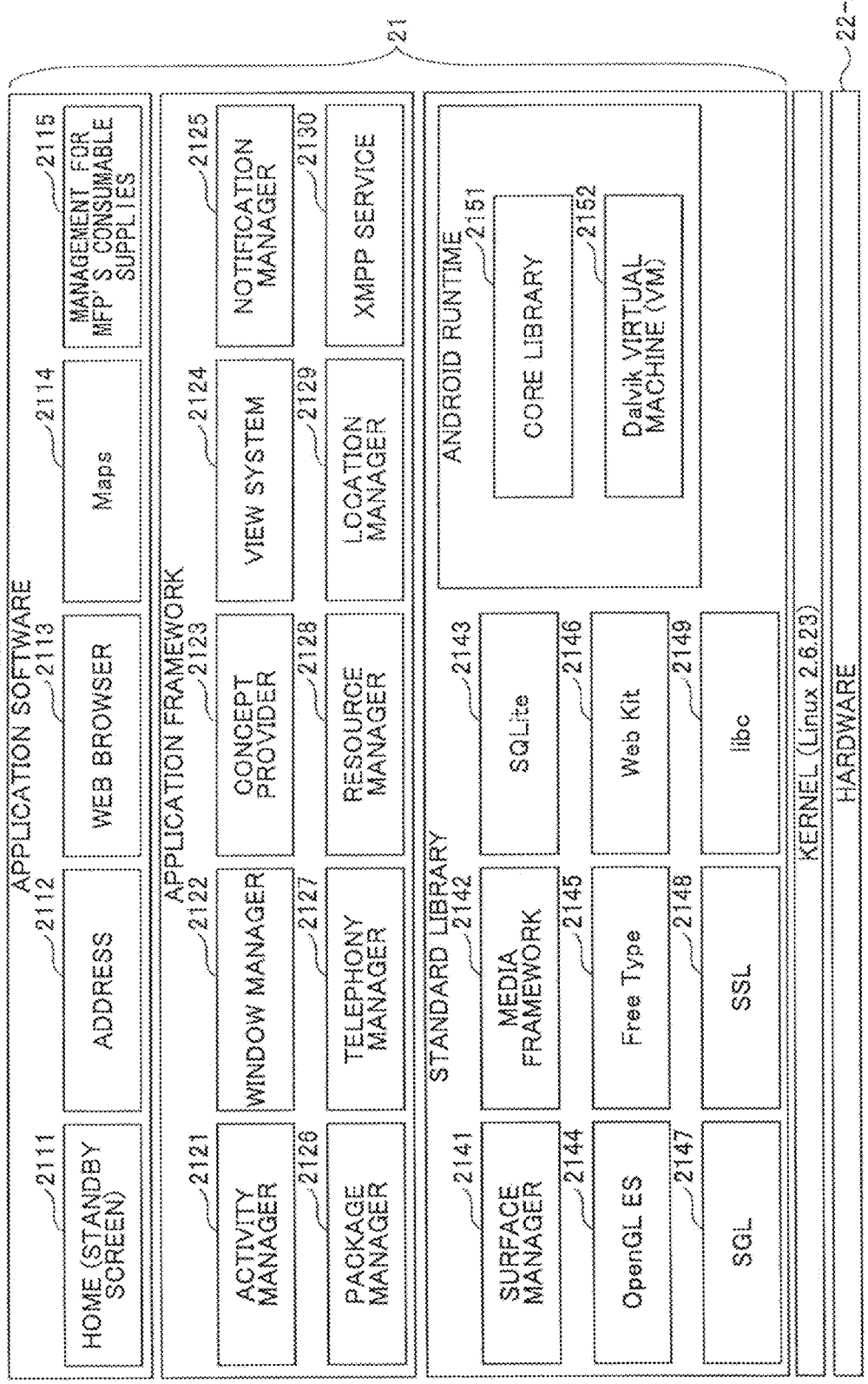
FIG. 3 is a drawing illustrating a functional block diagram for software configuration of a mobile device's controller in FIG. 1.

Here, a software configuration of the controller 21 is explained. The mobile device 20, for the purpose of illustration, may be a smart phone. FIG. 3 shows a functional block diagram of a software configuration for the controller 21 of the mobile device 20. As shown in FIG. 3, the software configuration of the controller 21 contains Linux which is an Operating System (OS) for a computer; and software including application software, an application framework, a standard library and the kernel (e.g. Linux 2.6.23).

The application software has function modules including a home application 2111 to create a standby screen, an address application 2112, a Web browser 2113, a Maps application 2114 and a management application for MFP's consumable supplies 2115. The notification function of consumable supplies management information described later is implemented by the management application for MFP's consumable supplies 2115.

The application framework has function modules including Activity manager 2121, Window manager 2122, Concept provider 2123, View system 2124, Notification manager 2125, Package manager 2126, Telephony manager 2127, Resource manager 2128, Location manager 2129, and eXtensible Messaging and Presence Protocol (XMPP) service 2130. Current position is obtained by the Location manager 2129 during the operation about the notification of the consumable supplies management information. In addition, the operating part 24 requests the Notification manager 2125 to perform the notification of the consumable supplies management information.

The standard library has function modules including Surface manager 2141, Media framework 2142, SQLite 2143, Open GL ES 2144, Free Type 2145, Web Kit 2146, SGL 2147, SSL 2148 and libc 2149; and elements of Android runtime including core library 2151 and Dalvik virtual machine (VM) 2152. A communication library included in the core library 2151 is used for communication with the MFP 10.

[Notification Function of the Consumable Supplies Management Information]

The communication system has a function to convey a notification about expiration of the consumable supplies from the MFP 10 to the mobile device 20. A conventional method is transmitting a notification to a user device, which indicates an expiration date of the consumable supplies and further information required to order the supplies when the date comes. The method may not fit a user who desires to visit a distributor of the consumable supplies but cannot spare time and finally may fail to visit and the expiration may trigger a serious problem.

A method of this invention solves the problem by providing a notification that notifies the user of expiration of the consumable supplies when the user is able to visit a dealer or a distributor of the supplies without taking much time. In the method, the notification function of consumable supplies management information about the communication system allows the MFP 10 to notify the mobile device 20 of expiration of the consumable supplies. In addition, the mobile device 20 may notify the user of the expiration of the consumable supplies on the operating part as a user interface when the current position measured by the position measuring part is located near the dealer.

<Basic Action of the Consumable Supplies Management Information Notification Function>

Figure 4:
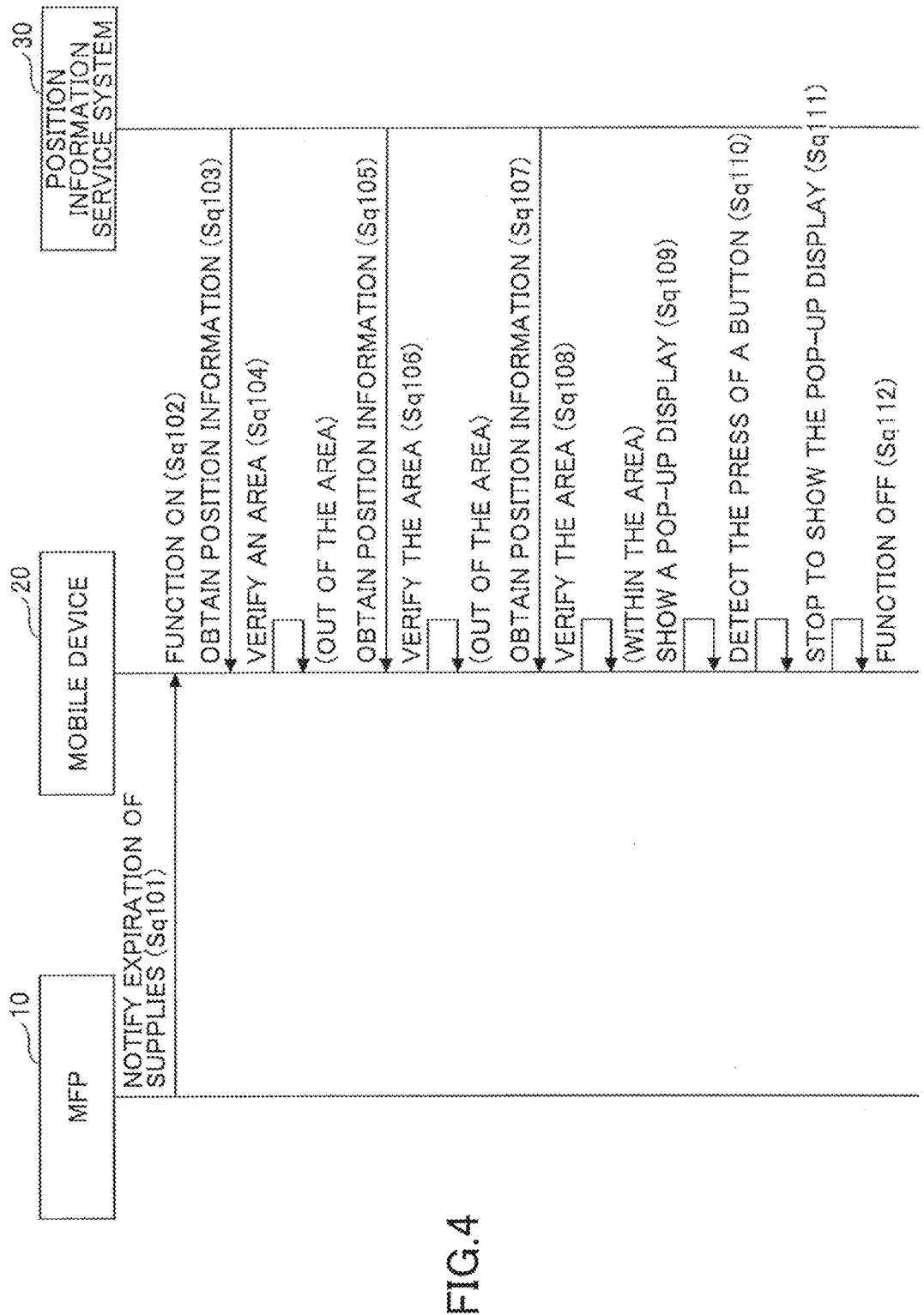
FIG. 4 is a drawing illustrating a sequence of a notification function for consumable supplies management information about the communication system of the invention.
Figure 5:
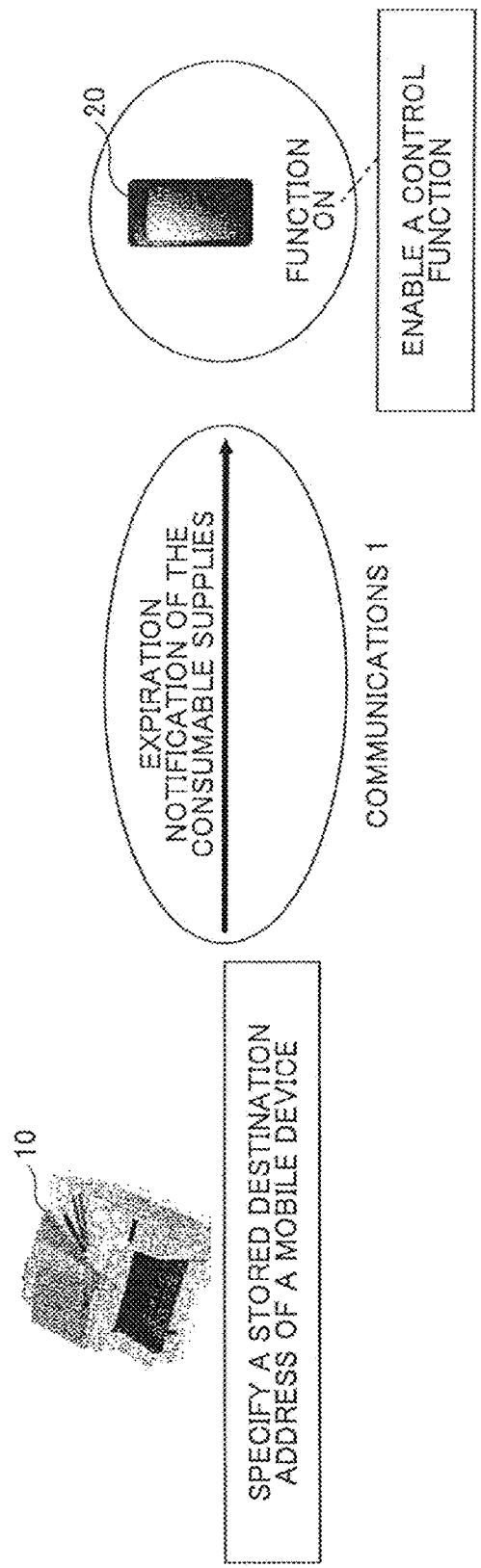
FIG. 5 is a drawing illustrating an expiration notification action in the consumable supplies management information notification function in FIG. 4, Sq 101 and Sq 102.
Figure 6:
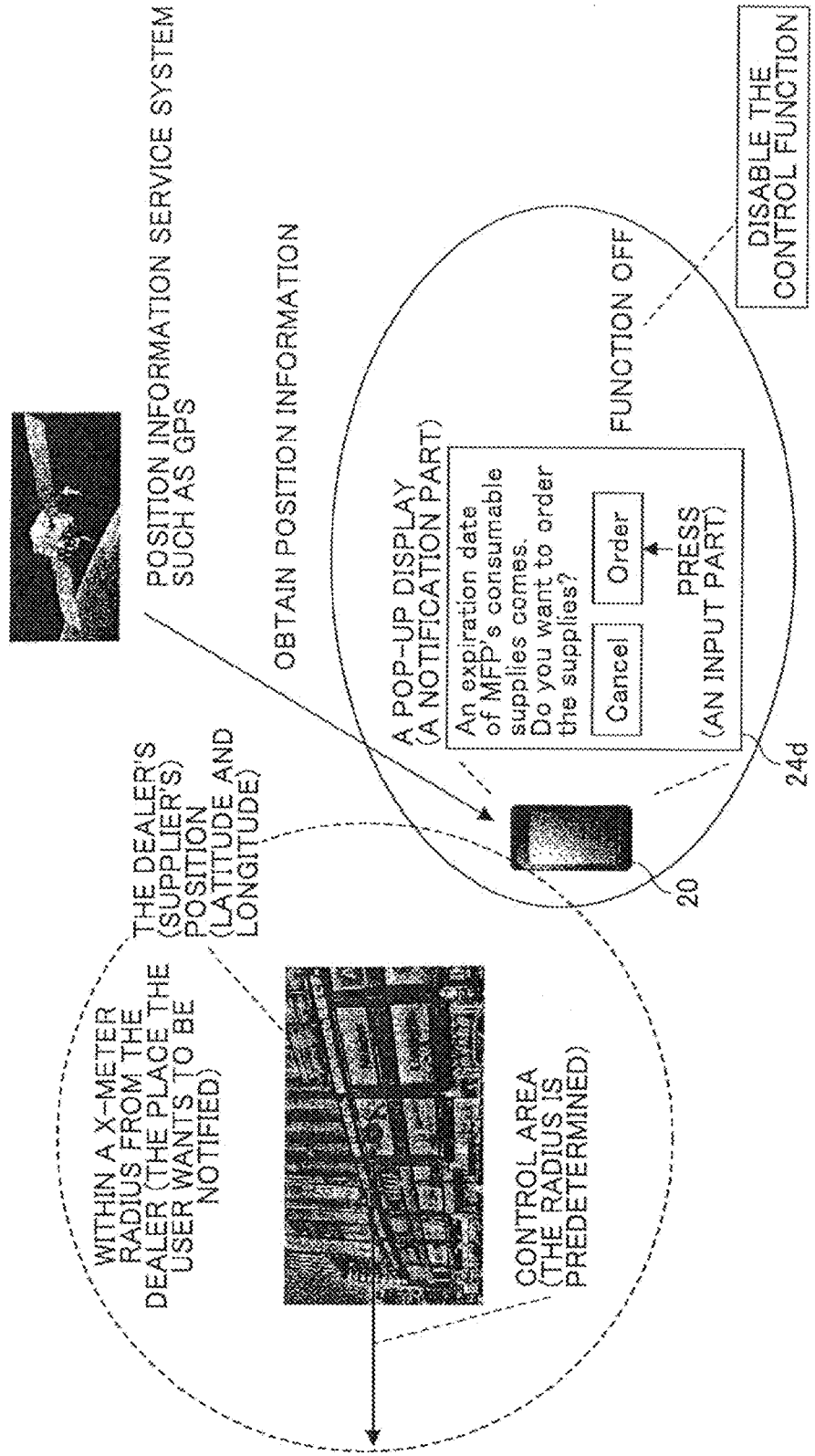
FIG. 6 is a drawing illustrating a display control action for expiration in the consumable supplies management information notification function in FIG. 4, Sq 101 and Sq 102.

First, a basic action of the notification function of the consumable supplies management information is explained, which is performed by the MFP 10 and the mobile device 20 via the communications 1 (See FIG. 1). FIG. 4 shows a sequence chart of the basic action of the notification function of the consumable supplies management information. Furthermore, FIG. 5 shows an action of the notification function of the consumable supplies management information (FIG. 4, Sq101, Sq102), and FIG. 6 shows an action of the notification function of the consumable supplies management information (FIG. 4, Sq103-112).

According to the sequence of FIG. 4, the MFP 10 notifies the mobile device 20 of expiration of the consumable supplies (Sq101). As indicated in FIG. 5 which shows an action when the notification is performed, the MFP 10 stores a destination address of the mobile device 20 in the memory part 12 in advance, and when an expiration date of the consumable supplies which the MFP 10 manages comes, the MFP 10 transmits a notification of the expiration of the consumable supplies to the specified mobile device 20 via the communications 1 (or a one-way communicating means). Here, a destination address of the mobile device 20 is specified, which device is owned and provided by an administrator or a user of the MFP 10 on the condition that the consumable supplies are to be ordered.

Figure 7:
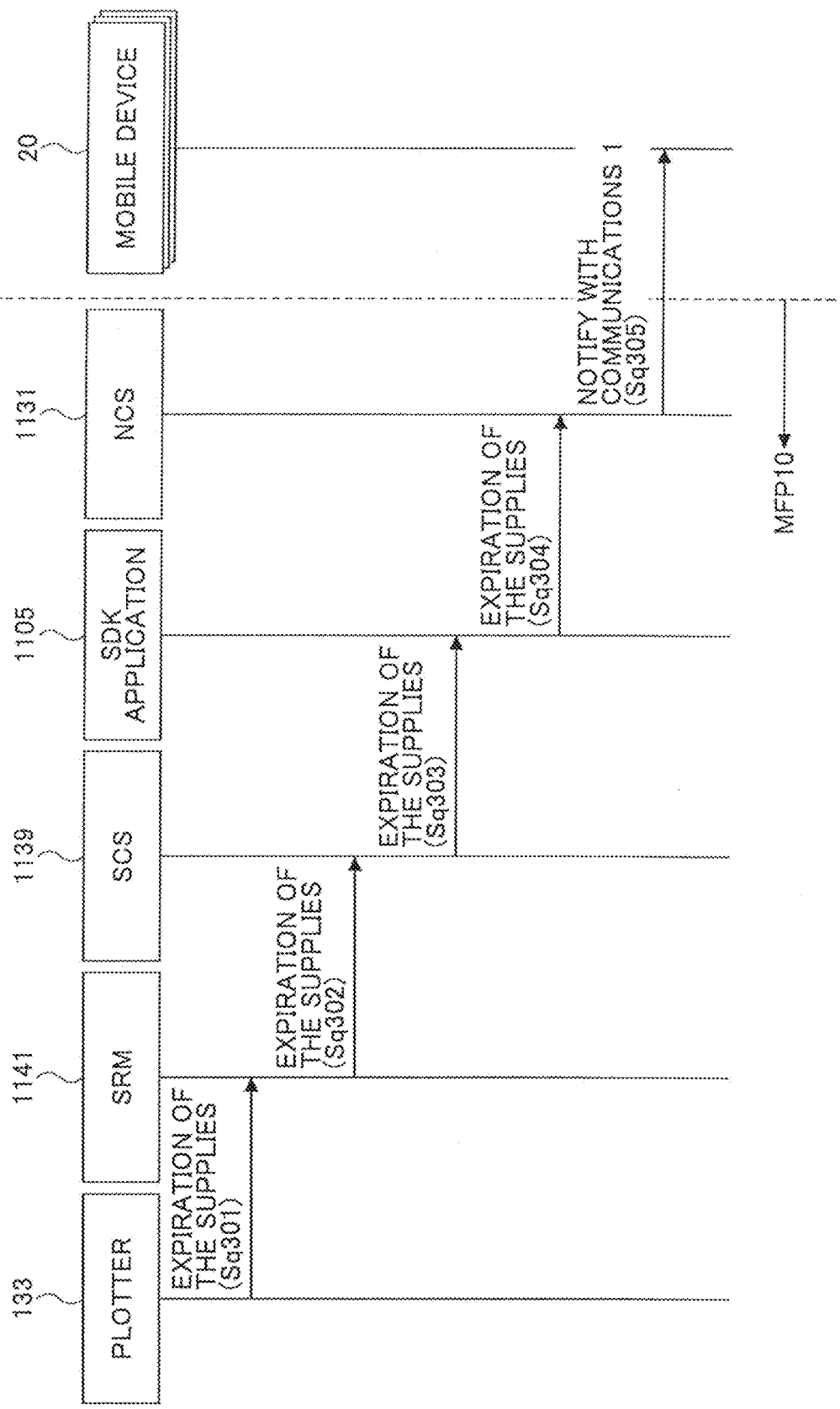
FIG. 7 is a drawing illustrating a sequence of MFP's actions which produce management information reporting an expiration of the consumable supplies.

The sequence described in FIG. 4 begins when management information is generated, which indicates expiration date of the consumable supplies is coming and a replacement of the supplies is required. Thus, the sequence described in FIG. 4 is triggered by the generation of the management information in the MFP 10. FIG. 7 illustrates actions in which the MFP 10 generates the management information indicating expiration of the consumable supplies. The plotter 133 of the MFP 10 monitors a usage condition of the consumable supplies such as toner, and when the MFP 10 detects "End or Near an end (of the toner)" which indicates expiration of the supplies, and the MFP 10 notifies the SRM 1141 (FIG. 2) of the expiration based on the detection result (Sq301). The SRM 1141 is a function module which performs hardware resource management and adjusts memory or plotter resources on image forming actions. The SRM 1141 notifies the SCS 1139 (FIG. 2) which configures a data processing and a device action condition to control the whole system of the information (Sq302).

The SCS 1139 notifies the SDK application 1105 created in order to implement the notification function of the consumable supplies management information of the information (Sq303). The SDK application 1105 passes the management information indicating expiration of the consumable supplies to the NCS 1131 providing a network service and directs the NCS 1131 to notify the mobile device 20 on a network of the management information (Sq304). The NCS 1131 notifies the mobile device 20 of the management information with the communications 1 via network in response to the direction (Sq305).

After the sequence described in FIG. 7, the MFP 10 invokes actions of the mobile device 20 described in FIG. 4. In response to the information received, the mobile device 20 which receives notification of expiration of the consumable supplies via the communications 1 sets status information which indicates whether a control function of the management application for MFP's consumable supplies 2115 to tell user the expiration is enabled or not (ON/OFF) as Function Enabled (Sq102). The status information (i.e. Function ON/OFF) is stored in the memory part 22. After the state transitions to the Function ON, the mobile device 20 uses the position information service system 30 to measure a position of the device with the position measuring part 25 (Sq103) and obtain position information. Based on the position information, the mobile device 20 verifies whether or not the current position falls within a control area (described in detail later) to perform the display control about expiration of the consumable supplies (i.e. so close to the dealer that the user can visit along the way) (Sq104).

Information to determine coverage of the control area is required. Here, the information includes a location of the dealer (supplier or distributor) (the position information specified by latitude and longitude) of the expired consumable supplies to be ordered and a size of the control area (See FIG. 6). The location of the dealer is stored in the memory part 22 in advance, which is associated with a kind of the consumable supplies and a name of the dealer in a table. The information for the size of the control area is specified using a circle centered on the location of the dealer and the width (e.g. diameter) of the circle which is modifiable via the operating part 24. The configured value is stored in the memory part 22. The control area is modifiable for each dealer (supplier) in consideration of the difference of access conditions between dealers (suppliers).

Information about a dealer (supplier) of the consumable supplies in the memory part 22 including the location of the dealer and the information specifying the size of the control area contains and keeps information about plural of the dealers. Preferably, information about the dealer of the consumable supplies is managed in an administration server (not shown in FIG. 1) in an integrated fashion, which is configured on the MFP 10 or the system. Thus the system is smoothly operated by managing information about the dealer of the consumable supplies in an integrated fashion and providing the information for the mobile device. It is especially advantageous for a system containing plural of the mobile devices (detail will be described in <Action of the consumable supplies Management Information Notification Function> in another embodiment).

The management application for MFP's consumable supplies 2115 uses the information to determine the control area. After receiving expiration of the consumable supplies and while the state is Function ON, the application periodically uses the position information service system 30 and measures a position of the device by the position measuring part 25. Each time current position information is obtained, the application verifies whether the position falls within the control area. That process may be repeated until the application confirms that the position falls within the control area (Sq105-Sq108). The verification process whether the position falls within the control area is basically repeated until the information is conveyed to the user. From a viewpoint of the system, the current position of the device is periodically measured by the position measuring part 25 using the position information service system 30 and verified while the state is Function ON (Sq105-Sq108). As a result of the verification, the current position measured is compared with the control area, and it is determined whether the position falls within the control area. For example, a distance between the current position of the device and the location of the dealer is calculated, and when the distance is smaller than the diameter of the control area, it is determined that the position falls within the control area.

When the management application for MFP's consumable supplies 2115 confirms that the position falls within the control area, the application performs display control for a pop-up display which notifies the user of expiration of the consumable supplies (Sq109). When the management application for MFP's consumable supplies 2115 confirms that the mobile device 20 has entered the control area (See FIG. 6), the application allows the display device of the operating part 24 working as a user interface to show a pop-up display 24d including a message such as "An expiration date of MFP's consumable supplies is coming. Do you want to order the supplies?" as well as a "Cancel" button and an "Order" button. A kind of the consumable supplies and a name of the dealer may be displayed in the screen (not shown in FIG. 6). In this embodiment the notification of expiration of the supplies is performed by the screen; however, the notification may be done by sound or other means which may provide similar information.

In a case where the user may not visit the dealer to order the supplies, the user may press the "Cancel" button in the pop-up display 24d. If the user may visit the dealer to order the supplies, the user may press the "Order" button in the display 24d and the mobile device may detect the pressing (Sq110). When the management application for MFP's consumable supplies 2115 detects the pressing of either of the buttons, the application stops to show the pop-up display (Sq111) and makes the control function of the action related to the notification function OFF (i.e. stops the control action) (Sq112). In addition, a history of user's selection about the pressing of "Cancel" or "Order" button is maintained, and another action may be correctly performed in a case where the MFP 10 transmits the same notification. The detailed descriptions of the Sq 103 through 111 are done within descriptions of Sq 402 through 414 in FIG. 11 because they are in common.

In addition, both the MFP 10 and the mobile device 20 in the system in FIG. 1 manage the time when the state becomes "Function ON" (i.e. the time when the notification function of the consumable supplies management information was enabled) and may stop the control action when a certain period of time passes after the time when the state becomes "Function ON". The control action by the period of time is to prevent the system from wasting resources due to the long-lasting "Function ON" state and that may result in decreasing of the performance of the system. The MFP 10 and the mobile device 20 may have means to perform the method in common. Thus, a time measuring part 16, 26 performs a timer action which compares an elapsed time since the time when the state became "Function ON" with a timeout period stored in the memory part 12, 22 in advance, and the time measuring part 16, 26 outputs a time signal when "Function OFF" is set (i.e. when timeout occurs). The SDK application 1105 of the MFP 10 or the management application for MFP's consumable supplies 2115 of the mobile device 20 receives the notification signal for the timeout from the corresponding time measuring part 16, 26, and then makes the notification function of the consumable supplies management information OFF and stops the action of the function.

According to the sequence in FIG. 4, the user may finish the order for the consumable supplies responding to the notification via the operating part so that the management information (including information about expiration of the consumable supplies and a dealer of the supplies) from the MFP which has a function to manage the consumable supplies is provided when the user (a holder of the mobile device 20) is located near the site of the dealer of the consumable supplies.

<Action of the Consumable Supplies Management Information Notification Function in Another Embodiment>

In this section, based on the notification function of the consumable supplies management information provided by the MFP 10 and the mobile device 20 via the communication 1 (See FIG. 1), another notification function of the consumable supplies management which is adapted to a system containing plural of the mobile devices 20 and actions of the function are described. The system using plural of the mobile devices 20 bi-directionally exchanges data by the communications 1 and 2 and the actions of the system are optimized for the plural of mobile devices.

Figure 8:
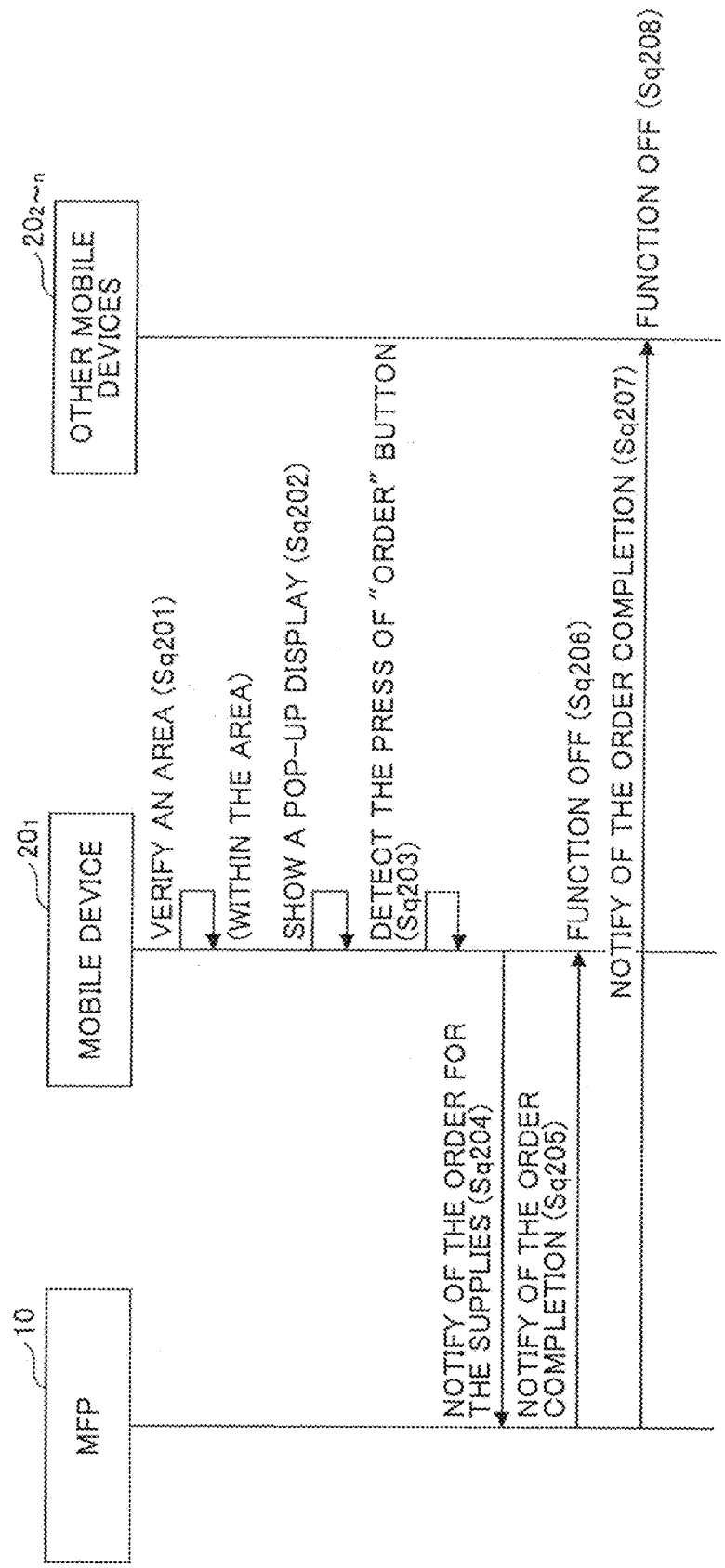
FIG. 8 is a drawing illustrating a sequence of a notification function for consumable supplies management information about a communication system of the invention, which includes plural of the mobile devices.
Figure 9:
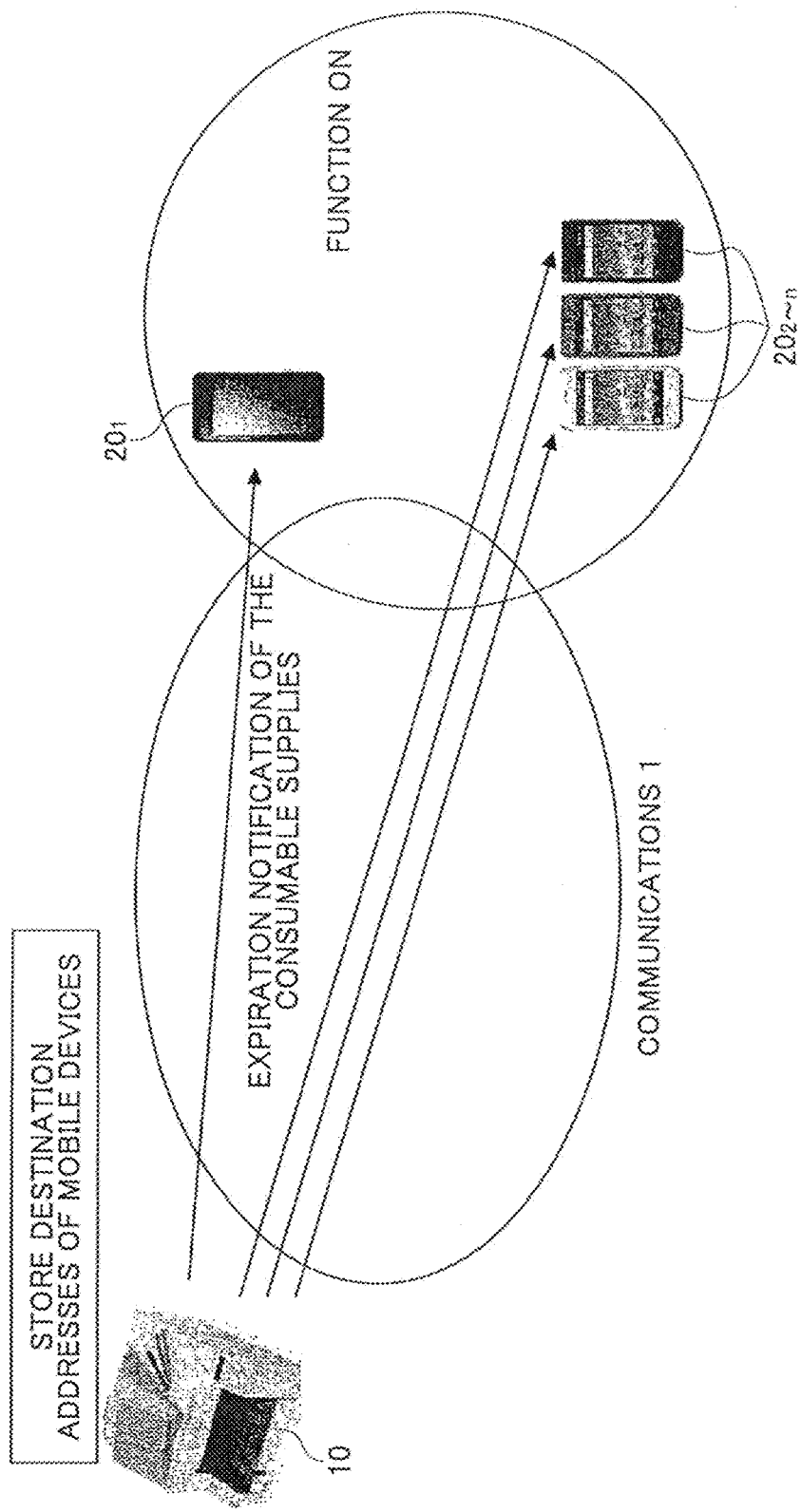
FIG. 9 is a drawing illustrating an expiration notification action in the consumable supplies management information notification function of FIG. 8.
Figure 10:
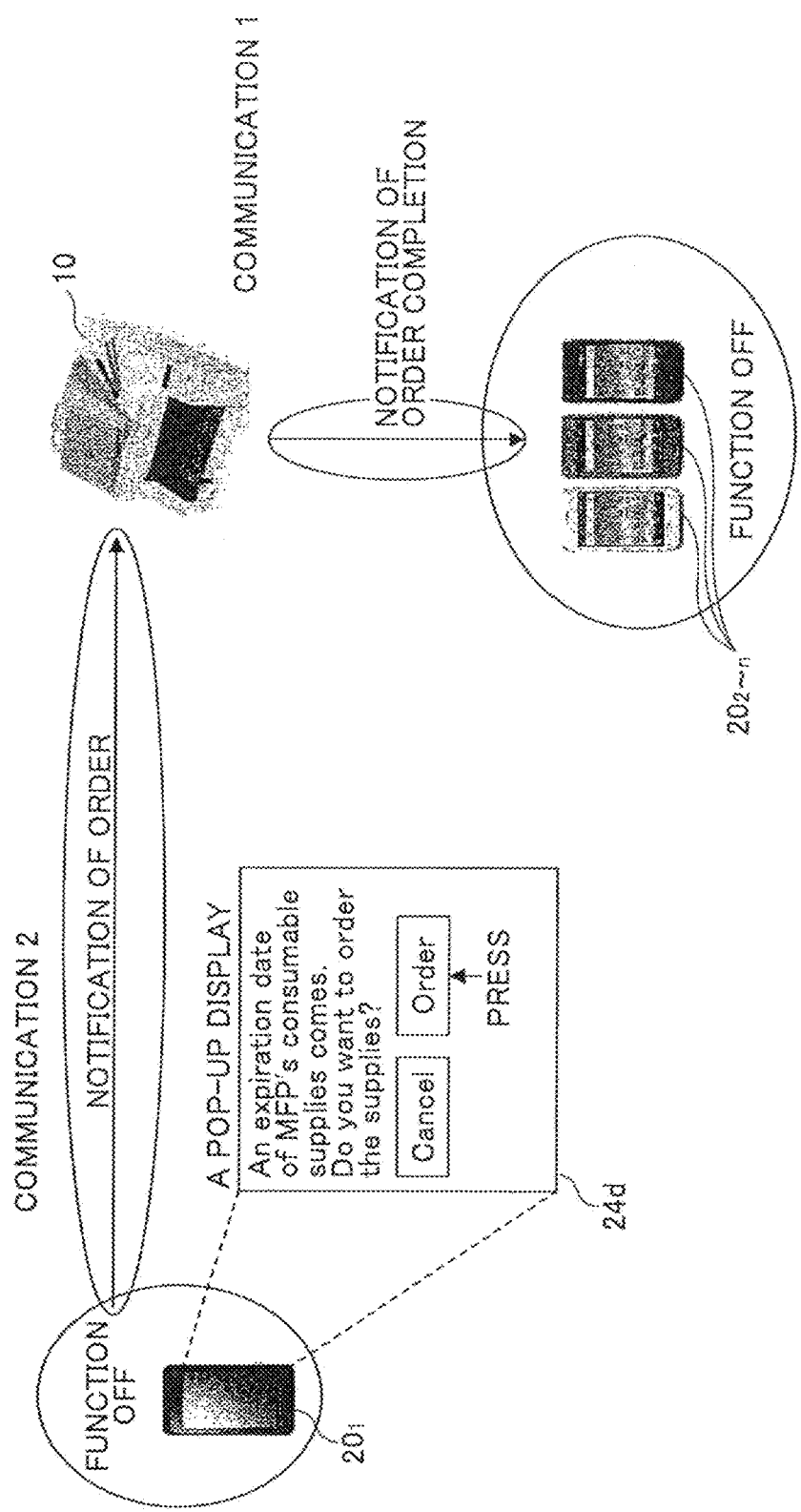
FIG. 10 is a drawing illustrating a notification action indicating completion of an order after a display of the expiration in the consumable supplies management information notification function of FIG. 8.

FIG. 8 shows a sequence chart describing actions of the notification function of the consumable supplies management information adapted to the system containing the plural of mobile devices $20_{1-n}$. FIG. 8 illustrates actions of the system by focusing on one of the mobile devices $20_{1-n}$ for the other mobile devices $20_{2-n}$, thus similar actions are performed in the mobile devices $20_{2-n}$. In addition, FIG. 9 illustrates an expiration notification action in the consumable supplies management information notification function. FIG. 10 illustrates a notification action indicating completion of an order after a display of the expiration in the consumable supplies management information notification function. FIG. 11 shows a sequence chart describing actions of the mobile device corresponding to the expiration notification of the consumable supplies.

FIG. 8 which describes the sequence of the actions in the consumable supplies management information notification function illustrates characteristics of the actions adapted to the system containing the plural of mobile devices $20_{1-n}$. In response to the expiration notification of the consumable supplies which is reported by the MFP 10 via the communications 1, each mobile device $20_{1-n}$ becomes "Function ON" state, and then the mobile device 20 performs the sequence in FIG. 11 which shows actions for a display control of pop-up screen in detail. Thus, the sequence described in FIG. 11 is discussed first, and then FIG. 8 is discussed.

Referring to FIG. 11, the MFP 10 notifies the mobile device 20 of expiration of the consumable supplies at the beginning of the sequence described in FIG. 11 (Sq401). As shown in FIG. 9 which illustrates actions performed upon the notification, the MFP 10 stores destination addresses of the mobile devices $20_{1-n}$ in the memory part 12 in advance. When the MFP 10 detects expiration of the consumable supplies which the MFP 10 manages, the MFP 10 transmits the expiration notification of the consumable supplies to the mobile devices $20_{1-n}$ specified by the addresses via the communication 1. Here, the destination addresses of the mobile devices $20_{1-n}$ owned by an administrator or a user of the MFP 10 are specified on the condition that the consumable supplies are to be ordered.

The sequence described in FIG. 11 begins when management information is generated, which indicates expiration date of the consumable supplies is coming and a replacement of the supplies is required. Thus, the sequence described in FIG. 11 is triggered by the generation of the management information in the MFP 10. The action in which the MFP 10 generates the management information indicating expiration of the consumable supplies and notifies the mobile device 20 of the management information via a network is in common with the action described in FIG. 7. Thus the description is omitted.

The mobile device 20 which receives the expiration notification of the consumable supplies transmitted by the MFP 10 via the communications 1 invokes a control action which tells the user about expiration of the supplies via the management application for MFP's consumable supplies. Sq401 through 416 described in FIG. 11 are basically in common with Sq101 through 111 in FIG. 4, which illustrates operations on the mobile device 20. The management application for MFP's consumable supplies 2115 on the mobile device 20 which receives the expiration notification of the consumable supplies via the communications 1 receives a request for a display control which notifies the user of the expiration in response to the notification via a communication library in the core library 2151 (Sq402).

The management application for MFP's consumable supplies 2115 actuates the control function according to the request for the display control and sets the state as "Function ON" (Sq403). After the state has transitioned to "Function ON", the management application for MFP's consumable supplies 2115 transmits a request to obtain position information to the location manager 2129 in order to obtain the position information measured by the position measuring part 25 using the position information service system 30. The location manager 2129 which receives the request obtains the information about the current position of the device 20 processed by the position measuring part 25 based on the position information using the position information service system 30 (Sq405). The location manager 2129 transmits the information about the current position of the device 20 to the management application for MFP's consumable supplies 2115 (Sq406).

Based on the obtained position information, the management application for MFP's consumable supplies 2115 verifies whether or not the current position falls within a control area to perform the display control about expiration of the consumable supplies (i.e. so close to the dealer that the user can visit along the way) (Sq407). The actual verification method is in common with Sq104 described in FIG. 4, thus the description of the method is skipped.

While the state is "Function ON", the management application for MFP's consumable supplies 2115 periodically verifies whether or not the current position falls within the control area until the application confirms that the position falls within the control area. When the position does not fall within the control area for the display control after the sequences Sq404 through 407, the application performs the verification sequences Sq408 through 414 as it was performed before. When the management application for MFP's consumable supplies 2115 confirms that the position falls within the control area (Sq411), the application requests the notification manager 2125 to perform display control for a pop-up display which notifies the user of expiration of the consumable supplies (Sq412).

The notification manager 2125 which is requested to perform the display control for the pop-up display shows the pop-up display (Sq413). As shown in FIG. 10, the pop-up display 24d includes a message such as "An expiration date of MFP's consumable supplies is coming. Do you want to order the supplies?" as well as a "Cancel" button and a "Order" button on the display device of the operating part 24 which works as a user interface. A kind of the consumable supplies and a name of the dealer may be displayed in the screen (not shown in FIG. 10).

In a case where the user may not visit the dealer to order the supplies, the user may press the "Cancel" button in the pop-up display 24d. If the user may visit the dealer to order the supplies, the user may press the "Order" button in the display 24d and the mobile device may detect the pressing (Sq414). When the management application for MFP's consumable supplies 2115 detects the pressing of either of the buttons, the application sends a pop-up display termination request to the notification manager 2125 to stop showing the pop-up display (Sq415). The notification manager 2125 which receives the request stops showing the pop-up display (Sq416).

When the "Order" button is pressed on the pop-up display by the user, the management application for MFP's consumable supplies 2115 transmits an order notification of MFP's consumable supplies to the MFP 10 with the communication library of the core library 2151 via the communications 2 (Sq418, Sq419) (details are described later with the sequence in FIG. 8). On the other hand, when the "Cancel" button is pressed on the pop-up display by the user, the management application for MFP's consumable supplies 2115 makes the state "Function OFF", which is enabled at Sq403 (i.e. stops the control action) (Sq417).

When the "Order" button is pressed on the pop-up display by the user in the sequence described in FIG. 11, the consumable supplies of which expiration is reported are basically replaced with new ones ordered by the user, and the expiration is cleared. An action for the expiration notification which is reported to other mobile devices is invalid, thus it is important to notify the other devices of that the expiration is cleared in order to maintain the performance of the system.

FIG. 8 shows the sequence of the action adapted to the system containing the plural mobile devices $20_{1-n}$. In FIG. 8, the mobile device $20_1$ performs the sequence described in FIG. 11, and the "Order" button of the mobile device $20_1$ is pressed. Based on the obtained current position, the mobile device $20_1$ verifies whether or not the current position falls within a control area (Sq201). When the mobile device $20_1$ determines that the position falls within the control area, the mobile device $20_1$ shows the pop-up display 24d (See FIG. 10) (Sq202). When the user presses the "Order" button on the pop-up display 24d (FIG. 10), the mobile device $20_1$ detects the pressing (Sq203).

The mobile device $20_1$ which detects the pressing of the "Order" button then transmits the order notification of the consumable supplies to the MFP 10 (Sq204). The indicator "→ Order notification" showed in FIG. 10 means this action is from the mobile device $20_1$ to the MFP 10. Soon after the MFP 10 receives the order notification of the consumable supplies from the mobile device $20_1$, the MFP 10 transmits the order completion notification, which indicates that the order for the consumable supplies is done, to the mobile devices $20_{2-n}$ (See FIG. 9) (Sq205, Sq207). The indicator "→ Order completion notification" shown in FIG. 10 means this action is from the MFP 10 to the mobile device $20_{2-n}$. In FIG. 10, the MFP 10 does not transmit the notification to the mobile device $20_1$; however, the MFP 10 may transmit the notification when the state of each mobile device $20_{2-n}$ transitions to "Function OFF" due to the notification. Each of the mobile devices $20_{1-n}$ which receives the order completion notification of the consumable supplies disables the control function related to the notification function of expiration of the consumable supplies (i.e. the state becomes "Function OFF") (Sq206, Sq208).

FIG. 12 shows a sequence diagram of actions on the MFP 10 when the MFP 10 receives the order completion notification of the consumable supplies. In FIG. 12, the NCS 1131 of the MFP 10 receives the order completion notification of the consumable supplies from the mobile device $20_1$ via the communications 2 (Sq501), and passes the notification to the SDK application 1105 (Sq502). When the SDK application 1105 receives the order completion notification of the consumable supplies, the SDK application 1105 passes the notification to the NCS 1131 providing a network service and directs the NCS 1131 to transmit the notification (Sq503) in order to notify all of the mobile devices $20_{2-n}$ (See FIG. 9), which receive the expiration notification of the consumable supplies, of the completion of the order. The NCS 1131 which receives the direction notifies each mobile device $20_{2-n}$ of the order completion notification of the consumable supplies with the communications 1 via the network (Sq504).

FIG. 13 shows a sequence chart of actions performed by the mobile device 20 when the mobile device 20 receives the order completion notification of the consumable supplies. In FIG. 13, the MFP 10 transmits the order completion notification of the consumable supplies with the communications 1, and then the communication library of the core library 2151 in the mobile device 20 receives the notification (Sq601). The communication library of the core library 2151 passes the received notification to the management application for MFP's consumable supplies 2115 (Sq602). According to the order completion notification received, the management application for MFP's consumable supplies 2115 makes the control function of the action related to the notification function of expiration of the consumable supplies, which is enabled previously (FIG. 11, Sq403), OFF (i.e. stops the control action) (Sq603).

Although it is not shown in the sequence of the other embodiment (FIG. 8, FIG. 11), in such a system using plural of the mobile devices 20, the MFP 10 or the mobile device 20 may manage the "Function ON" time to trigger the notification function of expiration of the consumable supplies, and may stop the control action by the function when an elapsed time reaches a predetermined timeout period. Both the MFP 10 and the mobile device 20 have the means to implement the action as illustrated in the section <Basic Action of the consumable supplies Management Information Notification Function>. The mobile device 20 may merely stop its own action; however, the MFP transmits a stop request to all of the mobile devices 20 whose function is enabled (Function ON) by transmitting the expiration notification in order to turn off the function and stop the control action by the expiration notification function.

According to the sequence in FIG. 8, the user may smoothly manage the consumable supplies because the MFP 10 having a management function of the consumable supplies notifies plural of the mobile devices $20_{1-n}$ of management information (including information about expiration of the consumable supplies or name of the dealer of the supplies). In addition, the user is prevented from taking needless actions and performance of the system does not decrease. This is because, soon after the completion of a required task such as an order for the consumable supplies to be replaced was reported to the MFP 10, the completion of the task is reported to all of the mobile devices $20_{1-n}$.

The present application is based on Japanese Priority Application No. 2012-061723 filed on Mar. 19, 2012 with the Japanese Patent Office, the entire contents of which are hereby incorporated by reference.

What is claimed is:

1. A communication system in which an apparatus transmits management information about management of consumable supplies and a mobile communication device receives the management information via a network,
    wherein the communication device comprises:
        a detection part configured to detect a position of the communication device;
        a memory part configured to store a name of a supplier of the consumable supplies and a position of the supplier;
        a setting part configured to set an area specified by a circle with a radius of predetermined length, which is centered on the position of the supplier stored in the memory part, as a control area;
        a display part; and
        a display control part configured to allow the display part to display the management information, the name of the supplier, and/or the position of the supplier when the display control part receives the management information from the apparatus and the position detected by the detection part falls within the control area.

2. The communication system as claimed in claim 1, wherein the communication device further comprises:
    an accepting part configured to accept an acknowledge operation which is performed after displaying the management information, the name of the supplier, and/or the position of the supplier; and
    a first stopping part configured to stop displaying the management information, the name of the supplier, and/or the position of the supplier when the accepting part accepts the acknowledge operation.

3. The communication system as claimed in claim 2,
    wherein the communication system has plural of communication devices identical to each other,
    one of the communication devices is the communication device that is able to communicate with the apparatus mutually and receive the management information from the apparatus,
    the one of the communication devices further comprises an acknowledgement transmitting part configured to transmit occurrence information indicative of an occurrence of the acknowledge operation to the apparatus when the accepting part accepts the acknowledge operation, and
    the apparatus comprises a first stop request transmitting part configured to transmit a request to stop displaying the management information, the name of the supplier, and/or the position of the supplier to other of the communication devices when the occurrence information is received from the one of the communication devices.

4. The communication system as claimed in claim 3, wherein the apparatus further comprises:
    a second time measuring part configured to measure a time period for which the apparatus has not received the occurrence information to be transmitted by the communication device since the apparatus was transmitted the management information; and
    a second stop request transmitting part configured to compare the time period measured by the second time measuring part with a second timeout period, and when the time period reaches the second timeout period, transmit a request to stop displaying the management information, the name of the supplier, and/or the position of the supplier to the communication devices.

5. The communication system as claimed in claim 1, wherein the memory part is able to store information about plural of suppliers.

6. The communication system as claimed in claim 5, wherein the display control part allows the display part to display the name and/or the position of one of the suppliers, which is selected by a selecting operation, and the name and/or the position are stored in the memory part.

7. The communication system as claimed in claim 1, wherein a size of the area set by the setting part is determined by a user operation.

8. The communication system as claimed in claim 1, wherein the communication device further comprises:
    a first time measuring part configured to measure a time period for which the display control part continues to allow the display part to display the management information, the name of the supplier, and/or the position of the supplier since the communication device has received the management information from the apparatus; and
    a second stopping part configured to compare the time period measured by the first time measuring part with a predetermined first timeout period, and when the time period reaches the first timeout period, stop the display by the display control part.

9. A method for a communication system in which an apparatus transmits management information about management of consumable supplies and a communication device receives the management information via a network, the method comprising:

detecting a position of the communication device with a detecting part;

setting an area specified by a circle with a radius of predetermined length, which is centered on a position of a supplier of the consumable supplies as a control area, wherein the position of the supplier is stored in a memory part of the communication device; and displaying the management information, a name of the supplier stored in the memory part, and/or the position of the supplier on the communication device when the communication device receives the management information from the apparatus and the position of the communication device detected by the detecting part falls within the control area.

10. The method as claimed in claim 9, wherein the method further comprises:

accepting an acknowledge operation on the communication device which is performed after displaying the management information, the name of the supplier, and/or the position of the supplier; and stopping displaying the management information, the name of the supplier, and/or the position of the supplier on the occasion of accepting the acknowledge operation.

11. The method as claimed in claim 10, wherein the communication system has plural of communication devices identical to each other, one of the communication devices is the communication device that is able to communicate with the apparatus mutually and receive the management information from the apparatus, wherein the method further comprises:

transmitting occurrence information indicative of an occurrence of the acknowledge operation from the one of the communication devices to the apparatus when the one of the communication devices accepts the acknowledge operation, and transmitting a request to stop displaying the management information, the name of the supplier, and/or the position of the supplier from the apparatus to other of the communication devices when the apparatus receives the occurrence information from the one of the communication devices.

12. The method as claimed in claim 11, wherein the method further comprises:

measuring a time period for which the apparatus has not received the occurrence information to be transmitted by the communication device since the apparatus has transmitted the management information;

comparing the time period with a second timeout period; and when the time period reaches the second timeout period, transmitting a request to stop displaying the management information, the name of the supplier, and/or the position of the supplier from the apparatus to the communication devices.

13. The method as claimed in claim 9, wherein the memory part is able to store information about plural of suppliers.

14. The method as claimed in claim 12, wherein displaying the management information, the name of the supplier stored in the memory part, and/or the position of the supplier includes displaying the name and/or the position of one of the suppliers, which is selected by a selecting operation, and the name and/or the position are stored in the memory part.

15. The method as claimed in claim 9, wherein a size of the area specified by the circle is determined by a user operation.

16. The method as claimed in claim 9, wherein the method further comprises:

measuring a time period of continuing to display the management information, the name of the supplier, and/or the position of the supplier since the communication device has received the management information from the apparatus;

comparing the time period with a predetermined first timeout period; and when the time period reaches the first timeout period, stopping displaying the management information, the name of the supplier, and/or the position of the supplier.

17. A computer-readable storage medium for storing a program therein, the program causing a communication system in which an apparatus transmits management information about management of consumable supplies and a mobile communication device receives the management information via a network to execute a method, the method comprising:

detecting a position of the communication device with a detecting part;

setting an area specified by a circle with a radius of predetermined length, which is centered on a position of a supplier of the consumable supplies as a control area, wherein the position of the supplier is stored in a memory part of the communication device; and displaying the management information, a name of the supplier stored in the memory part, and/or the position of the supplier on the communication device when the communication device receives the management information from the apparatus and the position of the communication device detected by the detecting part falls within the control area.

\* \* \* \* \*